United States Patent [19]

Yoshikawa

[11] Patent Number: 5,734,463
[45] Date of Patent: *Mar. 31, 1998

[54] PRINT PROCESSING METHOD, PHOTOGRAPHIC PRINTER, AND PRINT STACKING DEVICE AND METHOD

[75] Inventor: Sumio Yoshikawa, Kanagawa, Japan

[73] Assignee: Fuji Photo Film Co., Ltd., Kanagawa, Japan

[*] Notice: The term of this patent shall not extend beyond the expiration date of Pat. No. 5,583,610.

[21] Appl. No.: 711,055

[22] Filed: Sep. 9, 1996

Related U.S. Application Data

[60] Continuation of Ser. No. 466,457, Jun. 6, 1995, Pat. No. 5,583,610, which is a division of Ser. No. 75,280, Jun. 11, 1993, abandoned, which is a division of Ser. No. 907,575, Jul. 2, 1992, Pat. No. 5,274,422.

[30] Foreign Application Priority Data

Jul. 12, 1991 [JP] Japan ................................. 3-172079
Jul. 12, 1991 [JP] Japan ................................. 3-172080

[51] Int. Cl.⁶ ........................................ G03B 27/58
[52] U.S. Cl. ........................... 355/74; 355/40; 355/77
[58] Field of Search ........................... 355/18, 27–29, 355/39, 40, 41, 55, 56, 74, 77; G03B 29/00, 27/32

[56] References Cited

U.S. PATENT DOCUMENTS

| | | | |
|---|---|---|---|
| 3,019,886 | 2/1962 | Winkler et al. | 414/790.4 |
| 3,450,249 | 6/1969 | Poll | 414/790.4 |
| 3,631,979 | 1/1972 | Frankiewicz et al. | 209/583 |
| 3,706,373 | 12/1972 | Smith | 209/73 |
| 3,752,043 | 8/1973 | Rapparlie et al. | 414/790.4 |
| 3,857,220 | 12/1974 | Schneider et al. | 53/59 R |
| 4,114,349 | 9/1978 | Jensen et al. | 53/54 |
| 4,157,822 | 6/1979 | Miller | 271/303 X |
| 4,293,215 | 10/1981 | Rosborough, Jr. et al. | 355/40 |
| 4,441,702 | 4/1984 | Nagel et al. | 271/178 X |
| 4,746,111 | 5/1988 | Naramore | 271/287 |
| 4,777,515 | 10/1988 | Aikoh et al. | 355/41 X |
| 4,862,200 | 8/1989 | Hicks | 354/75 |
| 5,054,766 | 10/1991 | Seki et al. | 271/221 |
| 5,083,769 | 1/1992 | Young, Jr. | 271/280 |
| 5,124,742 | 6/1992 | Yoshikawa | 355/27 |
| 5,158,385 | 10/1992 | Imamura | 355/28 |
| 5,274,422 | 12/1993 | Yoshikawa | 355/77 |
| 5,287,141 | 2/1994 | Yoshikawa | 355/528 |
| 5,289,229 | 2/1994 | Manico et al. | 355/41 |
| 5,583,610 | 12/1996 | Yoshikawa | 355/74 |

FOREIGN PATENT DOCUMENTS 2313297  6/1975  France ................................. 209/933

*Primary Examiner*—R. L. Moses
*Assistant Examiner*—Shival Virmani
*Attorney, Agent, or Firm*—Sughrue, Mion, Zinn, Macpeak & Seas, PLLC

[57] ABSTRACT

A print processing method used in a photographic printer which can print images on a negative film which have different aspect ratios. The print processing method comprises the steps of judging the aspect ratio of each of the images printed on photographic paper, and printing cumulative numbers of prints of each aspect ratio onto the photographic paper of a final printing. The number of prints per aspect ratio can be easily known, and the cost of the prints can be calculated more efficiently.

5 Claims, 16 Drawing Sheets

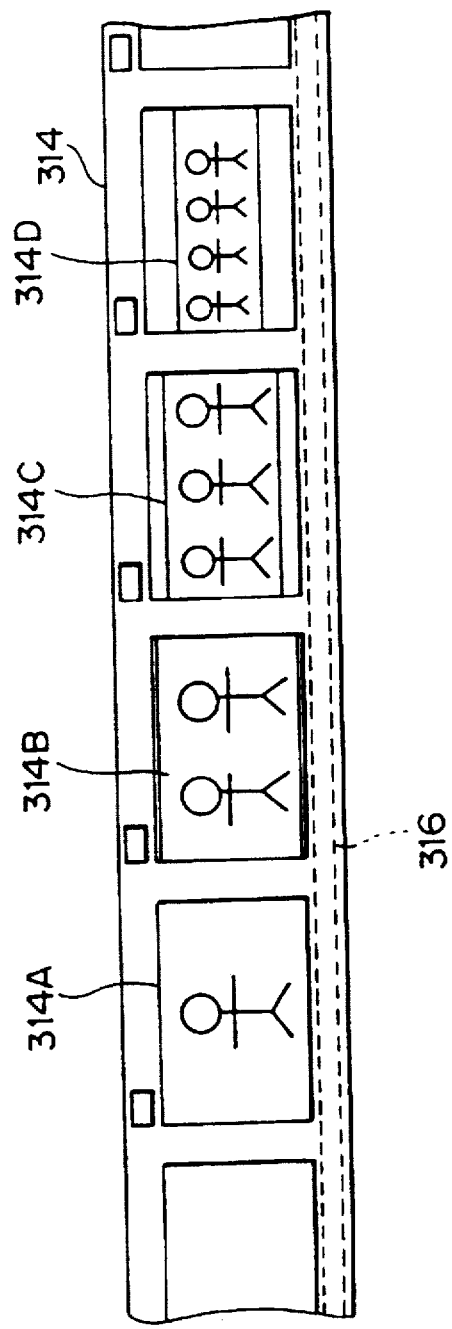

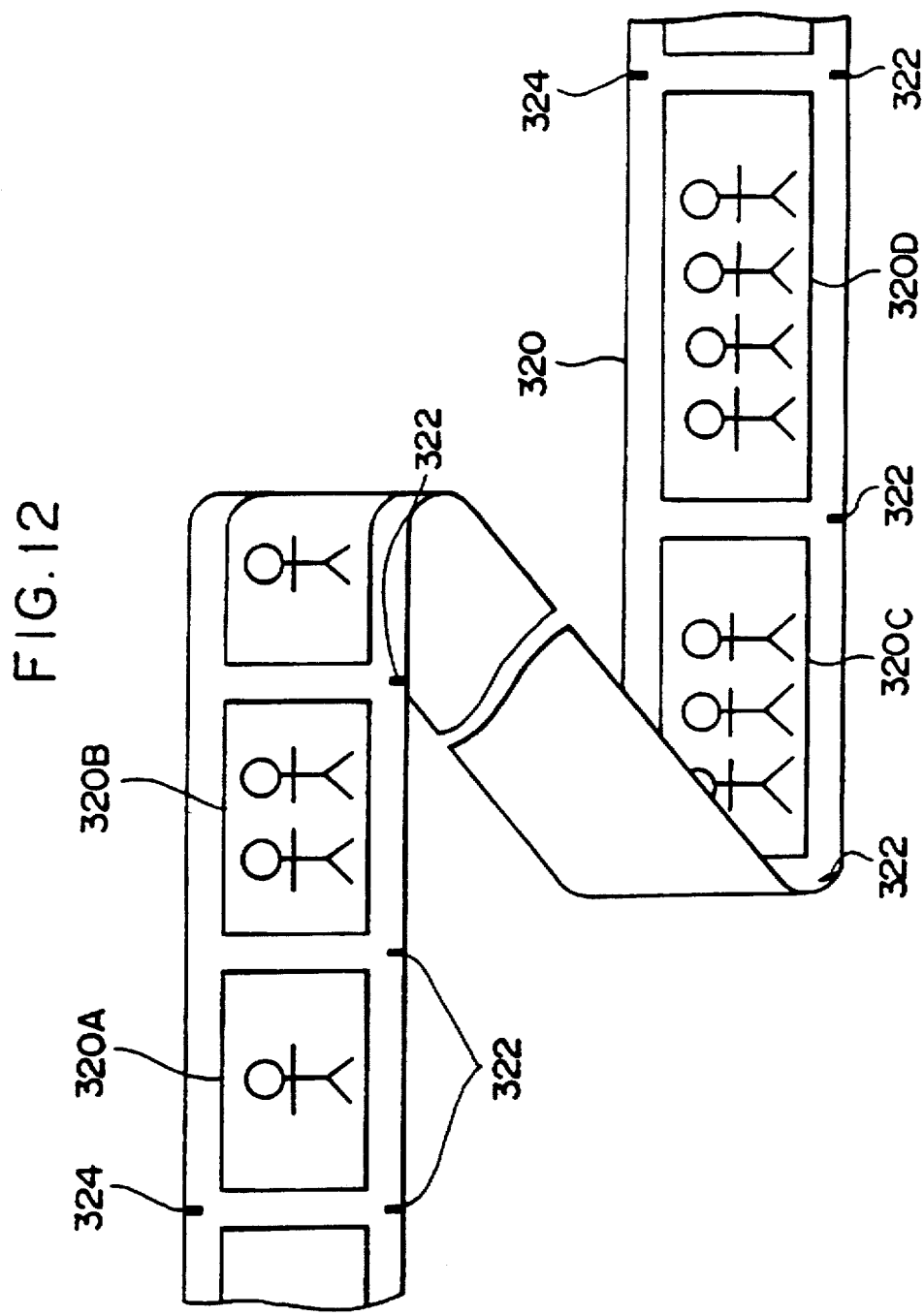

PRINT PROCESSING METHOD, PHOTOGRAPHIC PRINTER, AND PRINT STACKING DEVICE AND METHOD

This is a continuation of Application No. 08/466,457 filed Jun. 6, 1995, now U.S. Pat. No. 5,583,610, which is a divisional of Application No. 08/075,280 filed Jun. 11, 1993, now abandoned, which is a divisional of Application No. 07/907,575, filed Jul. 2, 1992, now U.S. Pat. No. 5,274,422.

BACKGROUND OF THE INVENTION

1. Field of the Invention

The present invention relates to a print processing method and a photographic printer for printing images of different aspect ratios, and also to a print stacking device and a print stacking method.

1. Description of the Related Art

Printer processors are set up at DPE stores, which are so-called mini-labs. An exposure portion, in which images recorded on a negative film are exposed, and a processor portion, in which exposed photographic paper is subject to developing processing, are formed integrally in the printer processor. By simply setting the elongated photographic paper at the printer processor, the photographic paper can be automatically transported to and processed at the exposure portion and the processor portion.

Some printer processors are equipped with a printing function to print the number of prints on the rear surface of a print. The printing function prints the order of prints printed from one roll of negative film on the rear surface of the print. In this way, the total number of prints printed from one roll of negative film can be known by looking at the rear surface of the final print.

At DPE stores, the calculation or verification of the cost of the prints is sometimes effected by using the number printed on the final print of the roll of negative film.

In recent years, the number of customers enjoying variations in photographing size, such as high vision size, cinerama size, panorama size, and the like, has increased. Accordingly, cameras which can photograph images of high vision, cinerama, panorama, and other sizes have been proposed. Such a camera can, on the same photographic film, effect standard photographing and also photograph images such as high vision, cinerama, panorama and other size images which have different aspect ratios, i.e., the ratio of the length of the short side of the image surface to the length of the long side thereof, which is the reference. As shown in FIG. 4A, the images are exposed onto the negative film such that the lengths of the longitudinal directions thereof are constant whereas the lengths of the transverse directions are varied. Namely, standard, high vision, cinerama, and panorama size images are exposed onto the same negative film at different aspect ratios (in FIG. 4A, only three types of print sizes are illustrated).

Further, some printer processors can print portions of the images. In these printer processors, the portions of the images other than those for which printing is desired can be masked, and printing onto photographic paper is effected. In this way, prints of different aspect ratios can be obtained.

When these kinds of images recorded on negative film are printed onto photographic paper at the printer processor, the lengths in the transverse direction of image portions of the photographic paper are uniform. The lengths in the longitudinal direction are varied by changing the projection magnification and the masking of the photographic paper in accordance with the aspect ratio of each image. In this way, the print sizes are changed, and prints of various sizes, such as standard, high vision, cinerama, and panorama, can be obtained.

However, prints of different aspect ratios have different prices. It is therefore difficult to calculate or verify the cost of the prints from simply looking at the total number of prints printed on the rear surface of the final print.

When images recorded on film are printed onto paper and processed at a photographic processing apparatus such as a printer processor, the images are photometrically measured when they are positioned at the exposure position. The exposure conditions are determined based on the photometric values, and the positioned images are printed onto paper at the determined exposure conditions. Further, a cut mark for each print is applied to the paper. A sort mark is applied to the paper for each print corresponding to one order. After the paper on which the prints are printed undergoes developing, fixing, washing, and drying processing, the cut marks are detected, and the paper is cut into prints. The prints are then transported into a print stacking device (sorter). The sort marks are detected at the print stacking device, and each order of prints is stacked in the order in which the prints were transported thereto. After the prints are stacked by the print stacking device, the finish and the like of each print are inspected at an inspection process. Thereafter, the prints are compared with the film, are placed in a DP bag along with the film, and are shipped.

As described above, in recent years, prints having high aspect ratios, such as panorama size prints, have become quite popular. Cameras which exclusively photograph panorama size images, and cameras which can photograph panorama size images by a panorama photograph adaptor or the like being attached thereto are sold. In print processing, the proportion of processed prints having high aspect ratios has increased. Further, aspect ratios of images recorded on a film can be varied at the camera, and printing processing may be requested for a roll of film on which images of different aspect ratios are photographed.

However, the printer processors described above are constructed on the premise that only images of a single aspect ratio are recorded on a roll of film. In the above-mentioned print stacking devices as well, the transported prints are only stacked per order in the order in which the prints are transported to the print stacking device. Therefore, when prints having different aspect ratios are transported to the print stacking device, the prints are stacked such that prints of different aspect ratios are mixed. This results in poor manageability of the prints after they have been stacked. The images cannot be inspected efficiently at the inspection process. Further, it is difficult to compare the images with the film. Moreover, as the prints are not sorted per size, the arrangement thereof is unattractive, which does not give the customer a good impression.

SUMMARY OF THE INVENTION

With the aforementioned in view, an object of the present invention is to provide a print processing method and a photographic printer in which cumulative numbers of prints of different aspect ratios can be verified. Further, an object of the present invention is to provide a print stacking device in which prints can be stacked so that inspection and verification work can be carried out easily. Another object of the present invention is to provide a print stacking method in which prints can be stacked so that inspection and verification work can be effected easily.

A first aspect of the present invention is a print processing method used in a photographic printer able to print a plurality of images having different aspect ratios. The print processing method includes steps of judging the aspect ratio of each of the plurality of images, and recording a cumulative number of prints, which is cumulative until a final print, of at least images having a same aspect ratio as a judged aspect ratio. The images are printed on photographic paper. Recording is effected by printing onto the photographic paper on which the images are printed.

A second aspect of the present invention is a print processing method which encompasses the first aspect and includes the following features. Portions of photographic paper obtained by final printings of images of each aspect ratio are sorted. When aspect ratios of images printed on the sorted photographic paper portions are judged, at least a cumulative number of prints, which is cumulative until a final printing, of images having the same aspect ratio as the judged aspect ratio is printed on each portion of photographic paper. The photographic paper portion is a portion of photographic paper of a size used for printing one image.

A third aspect of the present invention is a print processing method which encompasses the first aspect and includes the following features. A portion of photographic paper obtained by a final printing is sorted. When the aspect ratio of an image printed on a sorted photographic paper portion is judged, cumulative numbers of prints, which are cumulative until final printings, of images of each aspect ratio are printed on the photographic paper portion. The definition of photographic paper portion is given above.

A fourth aspect of the present invention is a print processing method which encompasses the third aspect and includes the following features. The sorted photographic paper portion is cut, and the cut photographic paper portion is placed on a topmost surface of a stack of photographic papers, on which the plurality of images are printed, so that printed contents of the cut photographic paper portion are seen. The definition of photographic paper portion is given above.

A fifth aspect of the present invention is a photographic printer able to print a plurality of images having different aspect ratios onto a photographic paper. The photographic printer includes a detection means for detecting aspect ratios of the plurality of images, a calculating means for calculating cumulative numbers of prints for each aspect ratio detected by the detection means, and a printing means for printing for each aspect ratio the cumulative numbers of prints, which are cumulative until a time of calculation and are calculated by the calculating means, onto the photographic paper on which the plurality of images is printed.

A sixth aspect of the present invention is a print stacking device for stacking a plurality of prints in which prints having different aspect ratios are mixed. The print stacking device includes a plurality of accommodating portions, an aspect ratio detection means detecting aspect ratios of each of the plurality of prints, guide means for guiding the each of the plurality of prints to one of the plurality of accommodating portions, control means for controlling the guide means to guide prints having a same aspect ratio to a same accommodating portion, and stacking means for stacking prints, which are guided to each of the accommodating portions, at one place in order of sizes of the aspect ratios.

A seventh aspect of the present invention is a print stacking method of stacking a plurality of prints in which prints having different aspect ratios are mixed. The print stacking method includes the following steps: (a) stacking each print at accommodating portions for prints having a same aspect ratio, and (b) stacking each group of prints, which are stacked according to the same aspect ratio, in one place in order of sizes of aspect ratios.

In the print processing method of the first aspect of the present invention, when the images are printed onto the photographic paper, the aspect ratios of the images are judged. The number of prints for each aspect ratio is calculated. Further, the cumulative number of prints until the final printing, which is calculated for each aspect ratio, is printed onto the photographic paper on which the images are printed.

In the printing processing method of the second aspect of the present invention, the final print of each aspect ratio is sorted. The cumulative number of prints is printed only on the photographic paper portion of the final print of each aspect ratio. The cumulative number of prints of an aspect ratio can be known by simply looking at the print of the final image of that aspect ratio.

In the printing processing method of the third aspect of the present invention, the final print is sorted, and the cumulative numbers of prints of all aspect ratios are printed only on the photographic paper portion of the final print. The cumulative numbers of prints of each aspect ratio can be known by looking at the print of the final image.

It is desirable to print the cumulative numbers together with marks indicating the print size of each aspect ratio.

In the printing processing method of the fourth aspect of the present invention, the final print obtained from the photographic film is discharged so as to face in a direction which is different from those of the other prints. Usually when printing paper which has been subject to print processing is discharged, the prints are discharged with the image surfaces thereof facing upward, and are sorted per order. However, in the present aspect, the print of the final image is discharged so that the portions of the printed photographic paper on which the cumulative numbers are printed can be seen. The cumulative numbers of the prints of each print size can thereby be verified.

In the photographic printer of the fifth aspect, when an image is printed onto the photographic paper, the aspect ratio is detected, and the cumulative number of prints for that aspect ratio is counted. Further, the cumulative number of prints for the aspect ratio is printed on the print by a printing means. By looking at the final print of a print size, the cumulative number of prints of the print size can be known.

A superior effect is achieved by the above-described first through fifth aspects in that calculation and verification of the cost of the prints is easy.

In the print stacking device of the sixth aspect of the present invention, the aspect ratio of each print is detected. Each print is guided into one of a plurality of accommodating portions so that prints of the same aspect ratio are guided to the same accommodating portion. The groups of prints within the accommodating portions are stacked at one place such that the groups of prints are stacked in order of their aspect ratios. In this way, each group of prints is formed of prints having the same aspect ratio, and the groups of prints are stacked in order of their aspect ratios. Therefore, the manageability of the prints improves, and inspection and verification work can be effected easily.

In a print stacking apparatus of a seventh aspect of the present invention, the prints are stacked per the same aspect ratio. The groups of prints, each of which includes prints having the same aspect ratio, are themselves stacked in order of aspect ratio. Therefore, the manageability of the prints improves, and inspection and verification work can be effected easily.

BRIEF DESCRIPTION OF THE DRAWINGS

FIG. 11 is a plan view illustrating an example of a negative film.

FIG. 12 is a plan view illustrating an example of a color paper.

DESCRIPTION OF THE PREFERRED EMBODIMENTS

First Embodiment

Figure 1:
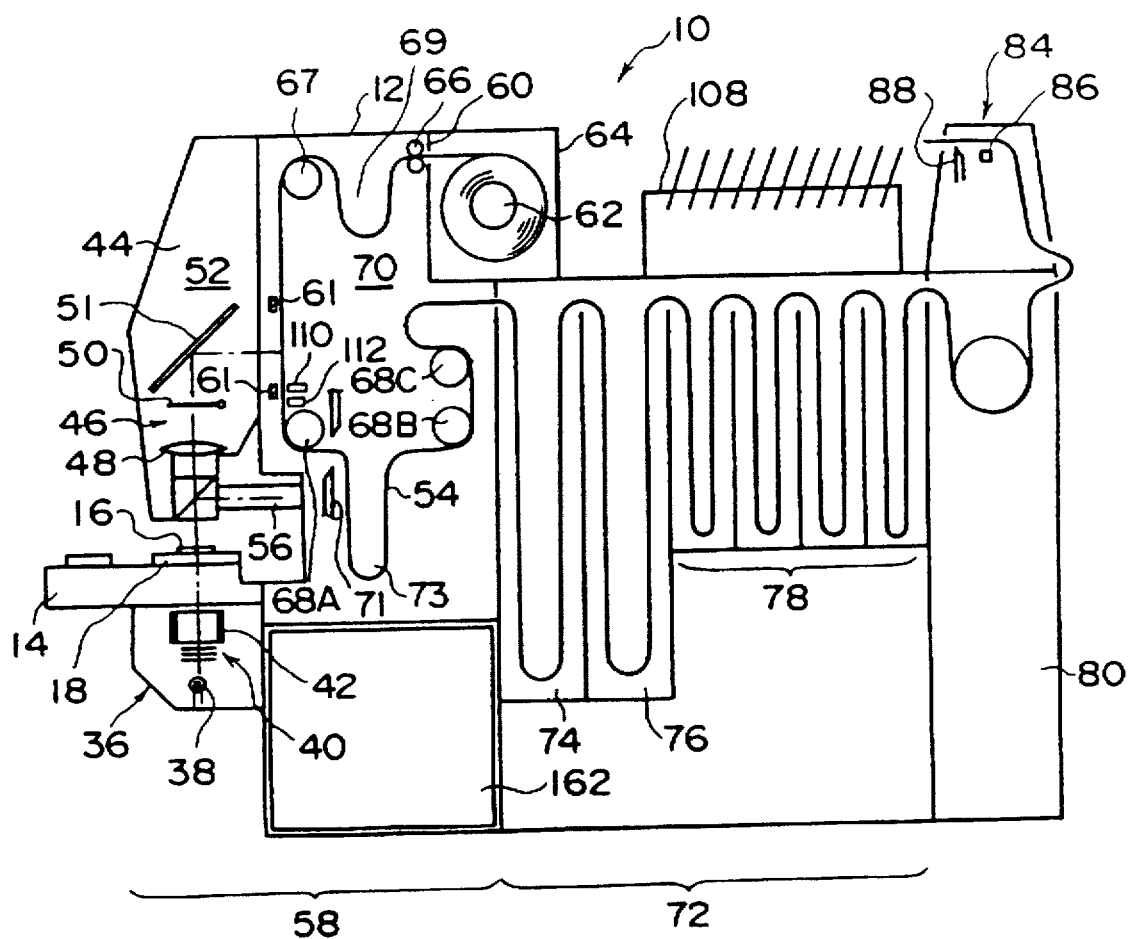
FIG. 1 is a schematic view illustrating an internal structure of a printer processor relating to an embodiment of first through third and fifth aspects of the present invention.

A printer processor 10, which is a photographic printer related to a first embodiment of first through third and fifth aspects of the present invention, is illustrated in FIG. 1. First, the entire structure of the printer processor 10 will be described.

The exterior of the printer processor 10 is covered by a casing 12. The printer processor 10 is equipped with a work table 14 which protrudes from the casing 12 at the left side in FIG. 1. A negative carrier 18, on which a negative film 16 is set, is disposed on an upper surface of the work table 14. The structure of the negative carrier 18 will be described in detail hereinafter.

A light source portion 36 is disposed beneath the work table 14. The light source portion 36 is equipped with a light source 38. Light irradiated from the light source 38 reaches the negative film 16, which is set on the negative carrier 18, via a filter portion 40 and a diffusion tube 42. The filter portion 40 is formed of a C, an M and a Y filter. Each filter can appear on and withdraw from the optical axis of the above-mentioned light.

An optical system 46 is mounted in an optical portion 44 located above the work table 14. The optical system 46 is equipped with a lens 48, a shutter 50 and a reflecting mirror 51. The lens 48 and the shutter 50 are disposed on the optical axis of the above-mentioned light. Light transmitted through the negative film 16 passes through the lens 48 and the shutter 50, and is deflected by the reflecting mirror 51 (the optical axis is approximately 90°) so as to form images of the negative film 16 onto photographic paper 54 set at an exposure room 52.

The optical system 45 is equipped with a density measuring device 56, e.g., a CCD or the like, which measures the density of the negative film 16. The density measuring device 56 is connected to a controller 162. An exposure correction value at the time of exposure is set based on data measured by the density measuring device 56 and on data key-input by an operator.

Printing processing is possible by the light source portion 36, the optical system 46, and the exposure room 52, which form a printer portion exposure portion 58.

A loading portion 60 is provided in a corner area of an upper right side surface of the optical portion 44 and an upper surface of the casing 12. A paper magazine 64, in which the photographic paper 54 is wound in a roll on a reel 62 and accommodated, is installed in the loading portion 60.

Rollers 66 are disposed in a vicinity of the loading portion 60. The photographic paper 54 is interposed between the rollers 66 and is transported horizontally to the exposure room 52. The photographic paper 54 is trained around a roller 67 in front of the optical portion 44, and the direction of the photographic paper 54 is changed by 90° such that the photographic paper 54 hangs downward. A first stock portion 69, in which the photographic paper 54 is guided and stocked in a substantial U-shape, is provided between the rollers 66 and the roller 67.

A variable mask 61, which masks the photographic paper 54 in accordance with the print size, is provided in the exposure room 52. Rollers 68A, 68B, 68C are disposed in a lower section of the exposure portion of the exposure room 52 so as to change the direction of the photographic paper 54, upon which the images of the negative film are printed in the exposure room 52, by 90° respectively. The rollers 68A, 68B, 68C transport the photographic paper 54 to a color developing portion 74 of a processor section 72 which is adjacent to the exposure room 52.

A printer 110 and a cut mark applier 112 are provided upstream of the roller 68A. The printer 110 prints size marks 100, which show the print size, and cumulative numbers of prints N of the print sizes on the rear surface of the printed photographic paper 54. Further, the cut mark applier 112 applies cut marks between the printed images. When printing has been completed for all of the images of one roll of the negative film 16, the type of the cut marks which are applied to the photographic paper 54 by the cut mark applier 112 is changed. In this way, it is determined that the images which are subsequently printed are those of another negative film.

Figure 4A:
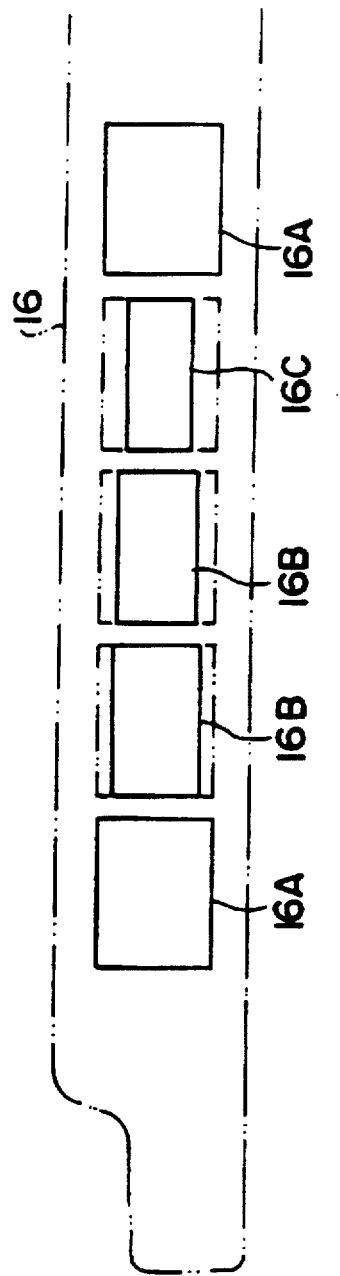
FIG. 4A is a plan view illustrating a negative film.
Figure 4B:
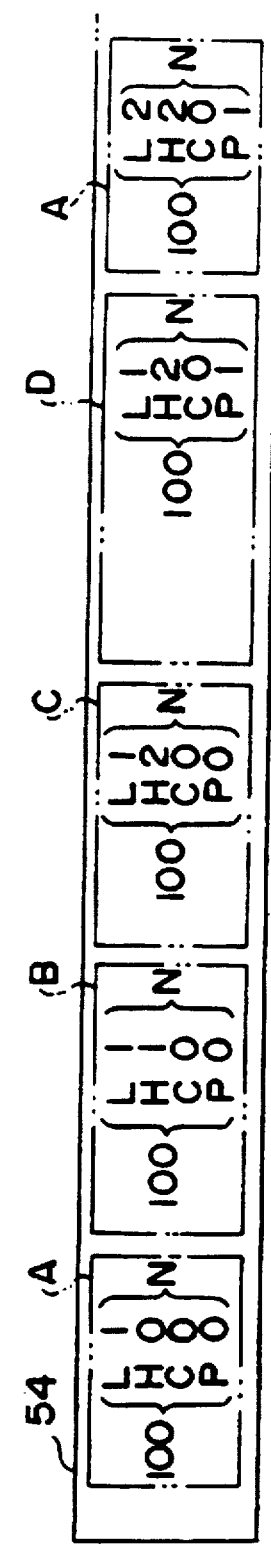
FIG. 4B is a plan view illustrating a printed photographic paper.

As shown in FIG. 4B, in the present embodiment, the size marks 100 of a standard print A, a high vision print B, a cinerama print (omitted from the present embodiment), and a panorama print E are printed respectively as L, H, C, P in that order. Following the size marks 100 are the cumulative numbers of prints N corresponding respectively to the print sizes.

As illustrated in FIG. 1, a cutter 71 is disposed downstream of the roller 68A. The cutter 71 cuts the rear end of the photographic paper 54 for which exposure processing has been completed. As a result, the photographic paper 54 remaining within the printer portion exposure portion 58 can be rewound again onto the paper magazine 64.

A second stock portion 73, in which the printed photographic paper 54 is guided and stocked in a substantial U-shape, is provided between the roller 68A and the roller 68B. In the second stock portion 73, the photographic paper 54 is stocked such that the difference between processing times of the printer portion exposure portion 58, where printing processing is effected, and the processor portion 72, where developing, fixing, and washing processing are effected, is absorbed.

In the color developing portion 74, the photographic paper 54 is immersed in developing solution and undergoes developing processing. The developed photographic paper 54 is transported to a bleaching/fixing portion 76 adjacent to the color developing portion 74. In the bleaching/fixing portion 76, the photographic paper 54 is immersed in fixing solution and undergoes fixing processing. The fixed photographic paper 54 is transported to a rinsing portion 78 adjacent to the bleaching/fixing portion 76. In the rinsing portion 78, the photographic paper 54 is immersed in washing water and undergoes washing processing.

The washed photographic paper 54 is transported to a drying portion 80 adjacent to the rinsing portion 78. In the drying portion 80, the photographic paper 54 is trained around a roller and is exposed to hot air so as to be dried.

The photographic paper 54 which has been dried is interposed between a pair of unillustrated rollers and is discharged from the drying portion 80 at a constant speed. A cutter portion 84 is disposed downstream of the drying portion 80. The cutter portion 84 is formed of a cut mark sensor 86, which detects the cut marks applied to the photographic paper 54, and a cutter 88, which cuts the photographic paper 54. Each image frame of the photographic paper 54 is cut at the cutter portion 84, and is discharged to the exterior of the casing 12 of the printer processor 10. Further, the cut mark sensor 86 detects the cut marks of the photographic paper 54 being transported at a constant speed, and operates the cutter 88.

The photographic paper 54, which has been cut and discharged, is sorted per roll of negative film to a sorter portion 108 as finished prints. The prints accommodated at the sorter portion 108 are placed in respective bags per each roll of film along with a delivery statement and the negative film, and are returned to the customer.

Figure 3:
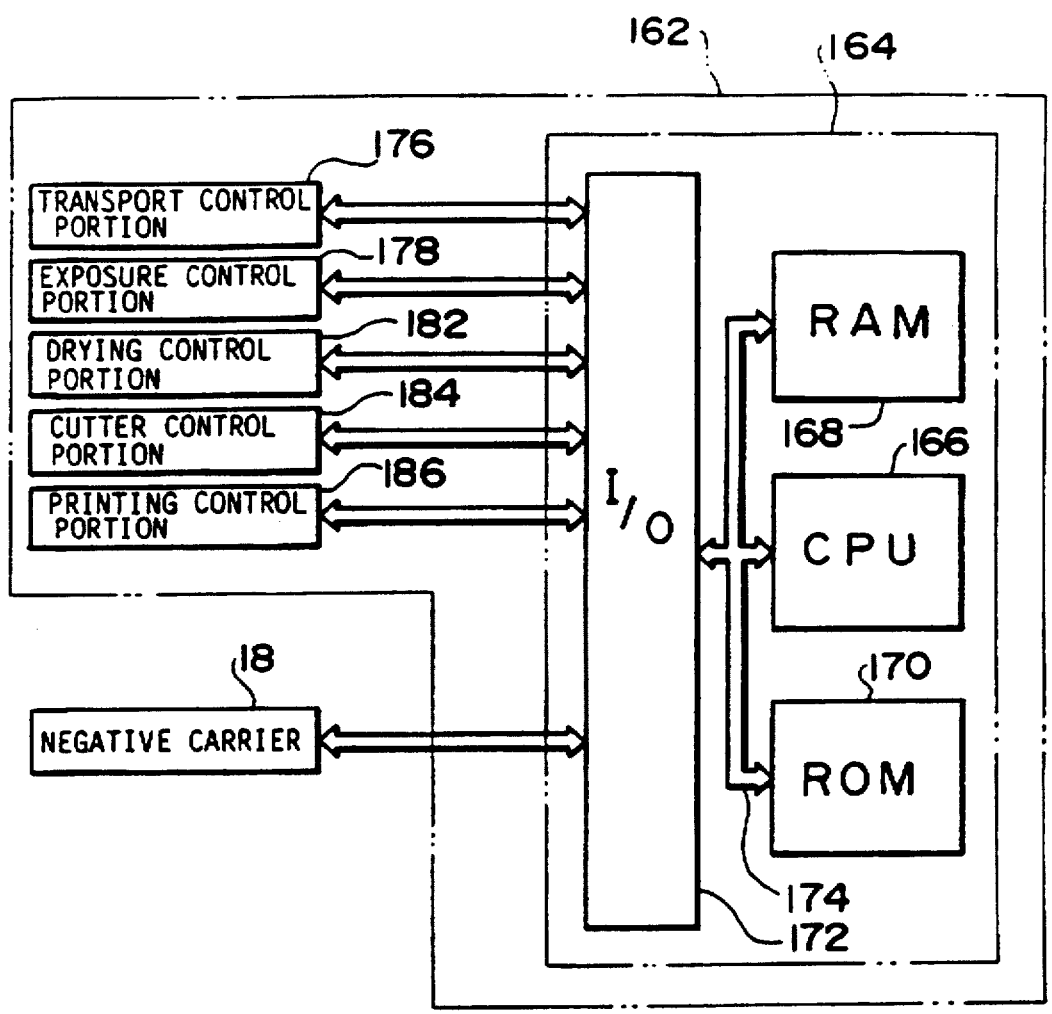
FIG. 3 is a control block diagram of the printer processor.

As shown in FIG. 3, each control is controlled by a controller 162. The controller 162 includes a microcomputer 164. The microcomputer 164 is formed of a CPU 166, a RAM 168, a ROM 170, an input/output I/O port 172, and a bus 174, such as a data bus or a control bus or the like, which connects the above components.

A transport control portion 176, which controls a transport system of the negative film 16 and the photographic paper 54 in the printer processor 10, is connected to the controller 162. An exposure control portion 178 is connected to the controller 162. The exposure control portion 178 controls an exposure system which includes the lighting of the light source 38 at the printer portion exposure portion 58, the appearance and withdrawal of the filter portion 40 on the path of light, the frame advancing at the negative carrier 18, the opening and closing of the shutter 50, and the like. A drying control portion 182, which controls the driving of a fan and a heater in the drying portion 80, is connected to the controller 162. Further, a cutter control portion 184, which controls the detection of cut marks by the cut mark sensor 86 at the cutter portion 84 downstream of the drying portion 80, and controls the cutting of the photographic paper 54 by the cutter 88, is connected to the controller 162.

Moreover, a printing control portion 186 is connected to the controller 162. The size marks 100, the cumulative numbers of prints N, and the cut marks are applied to the photographic paper 54 upon an operational signal from the controller 162. The negative carrier 18 is connected to the controller 162 as well.

Figure 2:
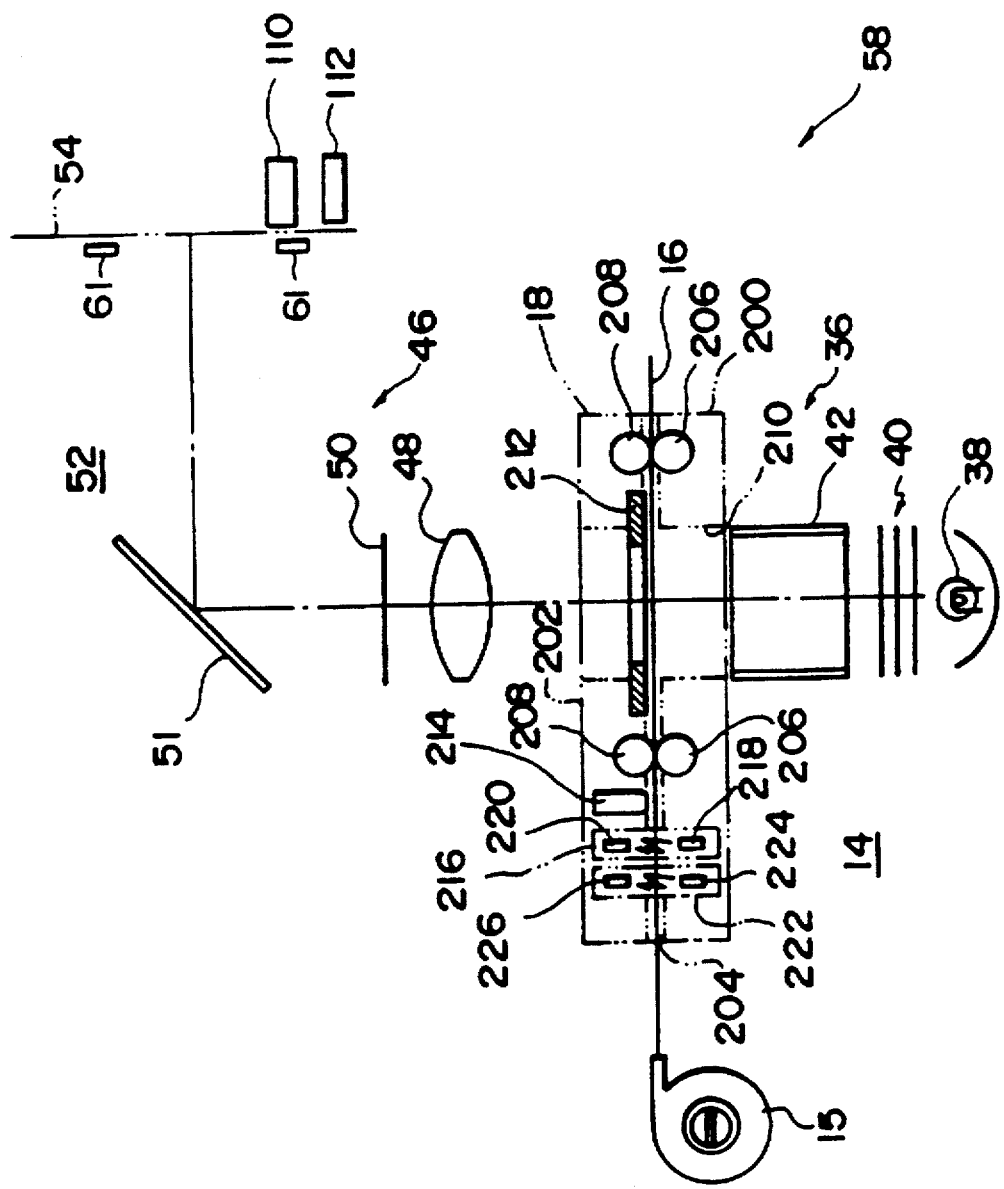
FIG. 2 is a schematic structural view of a negative carrier.

As shown in FIG. 2, the negative carrier 18 is disposed on the work table 14 in order to position the negative film 16 on the optical axis from the light source portion 36. The negative carrier 18 is formed mainly by a pedestal 200 and an opening/closing cover 202. A transport path 204 is formed between the pedestal 200 and the opening/closing cover 202. The negative film 16, which is withdrawn from a cartridge 15 or the like, is inserted through the transport path 204.

A portion of the outer peripheral portion of the pedestal 200 protrudes toward the transport path 204 of the negative film 16. A plurality of transport rollers 206, which are driven by an unillustrated pulse motor or the like, is provided thereat. Further, press rollers 208, which correspond respectively to the transport rollers 206, are provided at the opening/closing cover 202. The negative film 16 is interposed between and transported by the transport rollers 206 and the press rollers 208.

A printing opening 210 is formed in the pedestal 200 and in the opening/closing cover 202 on the optical axis from the light source 38. Image frames of the negative film 16, which is transported on the transport path 204, are positioned at the printing opening 210 and are exposed. An upper mask 212 is provided above the pedestal 200 at the printing opening 210. The upper mask 212 can freely mask the image frames so that the images are printed at high vision size, cinerama size, panorama size and the like, in addition to full size used for standard images. The mask size is changed by the driving of an unillustrated motor or the like in accordance with the aspect ratio of the negative film 16 positioned at the printing opening 210. Further, the negative film 16 is held between the pedestal 200 and the upper mask 212 by the driving of an unillustrated solenoid or the like.

A reading head 214, which projects from the opening/closing cover 202 into the transport path 204, is provided on the transport path 204 upstream of the printing opening 210. The reading head 214 is connected to the controller 162 via an unillustrated decoder such that magnetic information recorded on the negative film 16 is read by the microcomputer 164. Magnetic information recorded on the negative film 16 includes various types of information such as the number of images of the negative film 16, information regarding the aspect ratio and amount of exposure of each image, and the like. The recording medium of the information is not limited to a magnetic medium; an optical or an electronic memory or the like may be used.

A perforation detection sensor 216 is provided upstream of the reading head 214. In the perforation detection sensor 216, a light-emitting portion 218 and a light-receiving portion 220 are provided such that the transport path 204 of the negative film 16 is interposed therebetween. A signal line of the perforation detection sensor 216 is connected to the controller 162 via an unillustrated counter. The controller 162 controls the transport amount of the negative film 16 while counting the number of perforations formed in the negative film 16.

A image plane detection sensor 222 is provided in a vicinity of the perforation detection sensor 216. The image plane detection sensor 222 detects image frames of negative films 16, which are not restricted to one perforation per image frame, and positions the image frames at the printing opening 210. In the image plane detection sensor 222, a light-emitting portion 224 and a light-receiving portion 226 are provided such that the transport path 204 of the negative film 16 is interposed therebetween. In the light-emitting element 224, a plurality of light-emitting elements, such as light-emitting diodes (LEDs) or the like, is ordered along the transverse direction of the transport path 204 such that uniform light is irradiated along the transverse direction of the transport path 204. In the light-receiving portion 226, light-receiving elements are ordered so as to correspond respectively to the light-emitting elements. The light-receiving portion 226 detects variations in the intensity of light by the light irradiated from the light-emitting portion 224 being transmitted through the negative film 16. In this way, the edges of each image frame are detected. The image plane detection sensor 222 is connected to the controller 162. Each image frame is positioned at the printing opening 210 in accordance with the detected edges. Besides magnetically recording information regarding the aspect ratio as described above, the image plane detection sensor 222 may be used to detect the image size and judge the aspect ratio.

An unillustrated counter is provided at the controller 162. When a standard image, high vision image, cinerama image or panorama image is printed, the value of the counter is increased, and the counter stores the cumulative number of prints N for each roll of negative film.

Further, as shown in FIG. 4A, the standard images 16A, the high vision images 16B, and the panorama images 16C are recorded on the negative film 16 relating to the present embodiment. These images are recorded in image areas of the same size having uniform lengths in the longitudinal direction. The aspect ratio is changed by changing the lengths in the transverse direction.

The operation of the present embodiment will be described hereinafter.

Figure 6:
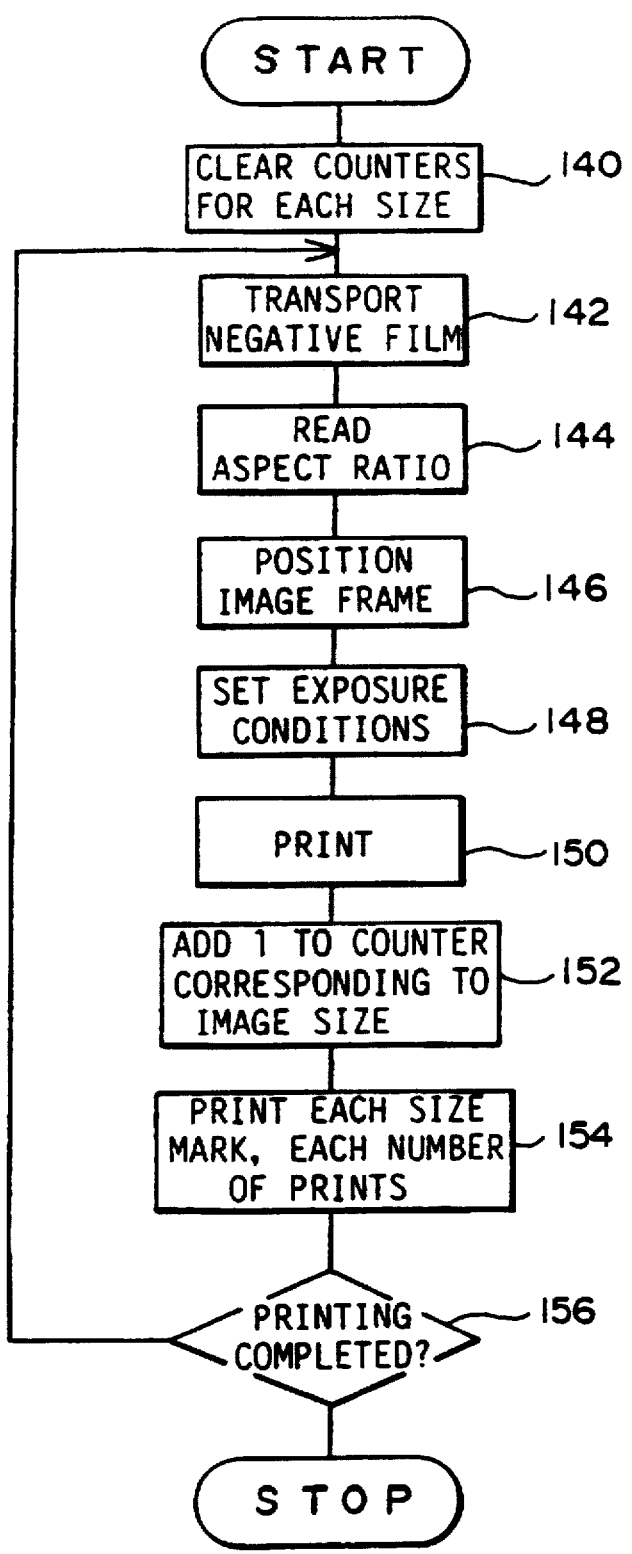
FIG. 6 is a flowchart illustrating operation of a control device.

Printing operation at the printer processor 10 will be described according to the flowchart shown in FIG. 6.

First, in Step 140, counters L, H, C, P, which are provided at the controller 162 and which correspond respectively to the print sizes, are all cleared. The negative carrier 18 transports the negative film 16 (step 142). The perforation detection sensor 216 detects the perforations of the negative film 16 so that the transport amount of the negative film 16 is controlled.

As the negative film 16 is transported within the negative carrier 18, the aspect ratio information recorded on the negative film 16 is read by the reading head 214 (step 144). Thereafter, an image frame is positioned at the printing opening 210 (step 146).

In step 148, the exposure conditions are set. The LATD (large area transmittance density) of the negative film 16 is measured by the density measuring device 56. An exposure correction value is set from the measured data and from data key-input manually. The amount of exposure (exposure time) is calculated so that an optimal print is obtained. The amount of exposure may be determined by magnetic information, which is recorded on the negative film 16, being read by the reading head 214 and the recorded amount of exposure being used as a standard.

Further, in the setting of the exposure conditions, the image frame is masked by the upper mask 212 in accordance with the aspect ratio. The upper mask 212 is changed so as to correspond to the aspect ratio read by the reading head 214. The lens 48 becomes a zoom lens. The projection magnification corresponding to the aspect ratio and the opening of the variable mask 61 are varied such that the masking of the photographic paper 54 can be changed.

When the exposure conditions have been set, printing processing is effected (step 150). The light source 38 is lit, and the photographic paper 54 is transported and positioned in the exposure room 52. The shutter 50 is opened. Accordingly, light irradiated from the light source 38 passes through the filter section 40 and the negative film 16, and reaches the exposure room 52. Printing of the images of the negative film 16 onto the photographic paper 54 positioned in the exposure room 52 begins. Each of the C, M, Y filters positioned on the optical axis of the above-mentioned light is moved in accordance with the exposure conditions. After the predetermined exposure time has elapsed, the shutter 50 is closed.

Further, in step 152, when the exposure conditions are set, 1 is added to the counter of the print size corresponding to the determined aspect ratio. For example, when printing is effected for a standard print, 1 is added to the counter L such that the counters read L=1, H=0, C=0, P=0.

Next, in step 154, each print mark 100 and each cumulative number of prints N is printed by the printer 110 onto the rear surface of the photographic paper 54 onto which the image has been printed. The cumulative numbers of prints N are the values of the counters corresponding to the respective print sizes.

Thereafter, the process returns a predetermined number of times to step 142, and printing onto the photographic paper 54 is repeated. When a determination is made (step 156) that printing processing has been completed for the final image, printing processing at the printer portion exposure portion 58 is finished.

For example, when printing each image frame of the negative film 16 shown in FIG. 4A onto the photographic paper 54, the size marks 100 and the cumulative numbers of prints N are printed as illustrated in FIG. 4B.

Cut marks are applied between the image frames of the photographic paper 54 by the cut mark applier 112. Completion of printing processing for one roll of the negative film 16 is indicated by the cut mark (omitted from FIG. 4B).

The photographic paper 54, on which the images of the negative film 16 have been printed, is transported successively to the processor portion 72 via a reservoir portion 70. The photographic paper 54, which is transported to the reservoir portion 70, is transported to the color developing portion 74 where the photographic paper 54 is immersed in developing solution and undergoes developing processing. The developed photographic paper 54 is transported to the bleaching/fixing portion 76 and undergoes fixing processing. The fixed photographic paper 54 is transported to the rinsing portion 78 and undergoes washing processing. The washed photographic paper 54 is transported to the drying portion 80 and undergoes drying processing.

Cut marks of the dried photographic paper 54 are detected at the cutter portion 84. The photographic paper 54 is cut into images which are sorted per roll of negative film by the sorter portion 108. By viewing the back of the final print of the sorted prints, the number of prints of each print size printed from the negative film 16 can be verified.

Figure 5A:
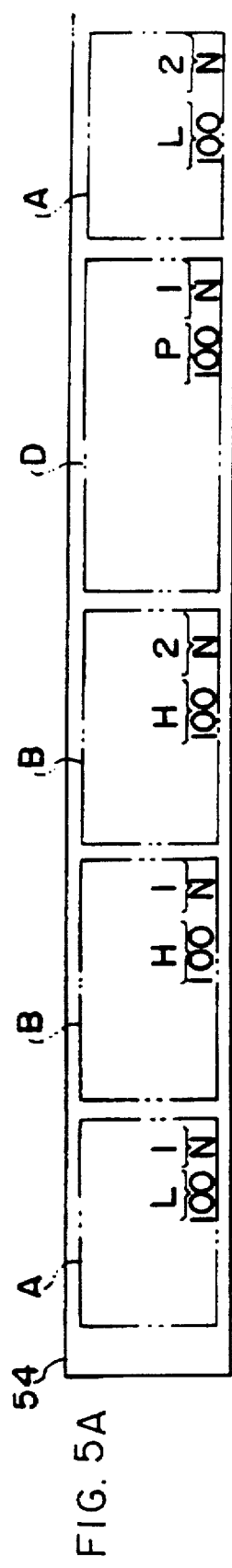
FIGS. 5A through 5C are plan views similar to FIG. 4B respectively illustrating variations of the printed photographic paper.

As shown in FIG. 5A, it is possible to print only the size mark 100 and the cumulative number of prints N of an image onto the rear surface of the printed photographic paper 54. Namely, because the print sizes of the finished prints are different, the cumulative number of prints of a certain print size can be known by looking at the final print of that size. In this case, it is not necessary to print the size mark 100.

Figure 5B:
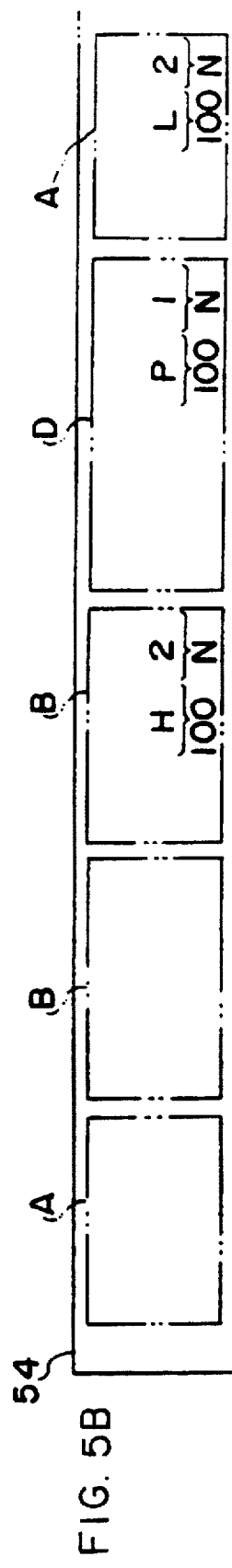

Moreover, as shown in FIG. 5B, it suffices to print the data only on the final print of each print size. In this case, the print size may be determined by the cut mark sensor 86 from the length between the cut marks or the like, and the sorter section 108 may be controlled to sort and accommodate the prints according to print size.

Figure 5C:
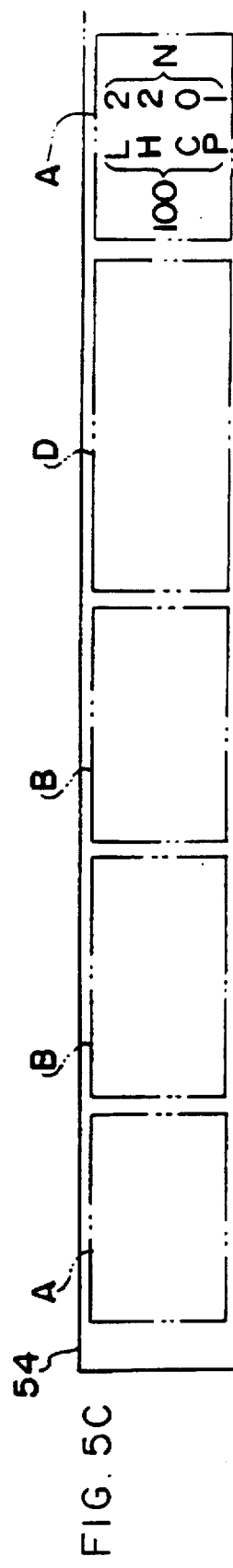

As shown in FIG. 5C, it suffices to print the size marks 100 of each print size and the cumulative numbers of prints N, which correspond respectively to the size marks 100, only on the rear surface of the photographic paper 54 onto which the final image of the negative film 16 has been printed. In this case, it is necessary to either read in advance the magnetic information recorded onto the negative film 16, or, at the start, to reference the images of the negative film 16 and verify the final image frame of each size.

At a photographic printer in which images recorded on the negative film 16 can be printed at an arbitrary aspect ratio by the operation of an operator, the cumulative numbers of prints and the cumulative length of photographic paper which has been used may be counted. The length may thereby be printed onto the photographic paper 54 on which the final image is printed.

Second Embodiment

Figure 7:
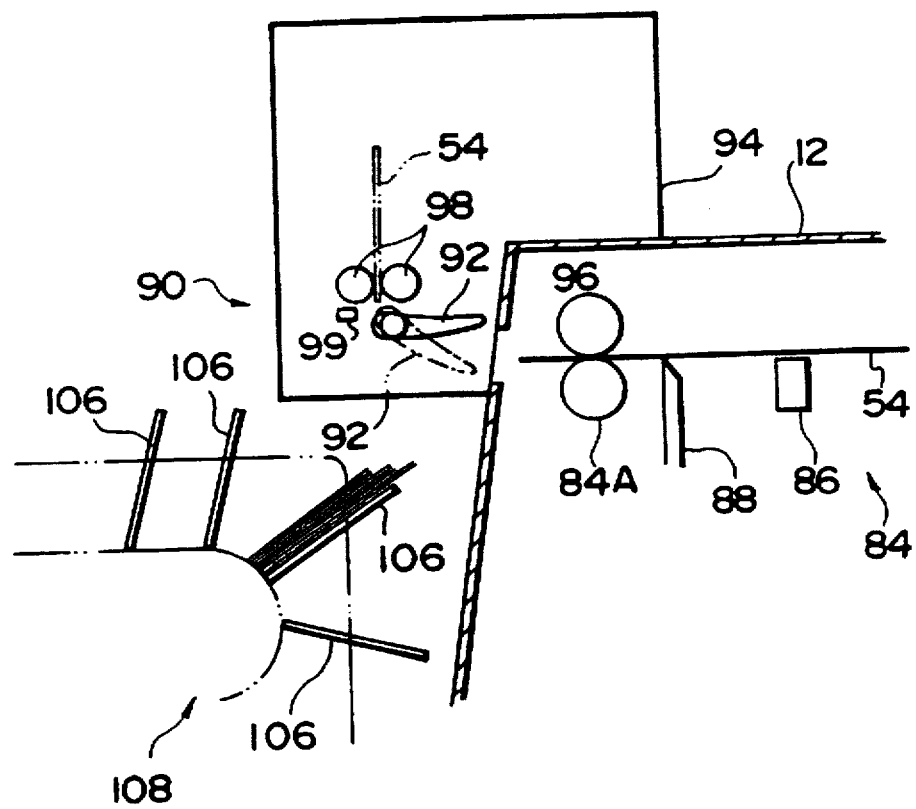
FIG. 7 is a schematic structural view illustrating a vicinity of a cutter portion relating to a second embodiment.

In FIG. 7, the schematic structure of a vicinity of the cutter portion 84 of the printer processor 10 relating to a second embodiment of a fourth aspect of the present invention is illustrated. The second embodiment has basically the same structure as that of the first embodiment. The same parts are denoted by the same symbols, and description thereof is omitted.

A print inverting device 90 is provided downstream of the cutter section 84. In the print inverting device 90, one end of a guide 92 is axially supported by a side plate 94. Another end of the guide 92 can project in a vicinity of a print discharge opening 96 formed in the casing 12. A pair of nipping rollers 98 are provided above the guide 92. By the tip end of the guide 92 pivoting in the vicinity of the print discharge opening 96, the photographic paper 54, which is interposed between and transported by rollers 84A of the cutter portion 84, is guided by the guide 92 and is pulled upward by the nipping rollers 98. Further, when the rear end portion of the final print is detected by a detector 99, the nipping rollers 98 are driven to rotate in the opposite direction. The photographic paper 54 is discharged to the sorter portion 108.

In this way, the photographic paper 54 is accommodated between partition plates 106 of the sorter portion 108 such that the rear surface of the photographic paper 54 faces upward.

The photographic paper 84 transported to the cutter portion 84 is cut into image frames by the cutter 88 in accordance with the cut marks detected by the cut mark sensor 86. Further, when the final image of one roll of the negative film 16 is printed, the cut mark is changed. When the cut mark, which shows the final image of one roll of negative film 16, is detected by the cut mark sensor 86, the print inverting device 90 is operated. When the photographic paper 54 on which the final image is printed is discharged from the cutter portion 84 to the sorter portion 108, the photographic paper 54 is inverted and accommodated.

When the prints of one roll of the negative film 16 which are stacked in the sorter portion 108 are placed in a bag, the final print, on which each print size and each cumulative number of prints are printed, is accommodated such that the printed surface thereof faces upward. Therefore, the print sizes and the number of prints can be verified. The calculation or verification of the cost of the prints can be easily carried out. Further, the print inverting device, which inverts the final photographic paper 54, is not limited to the above construction.

Figure 8:
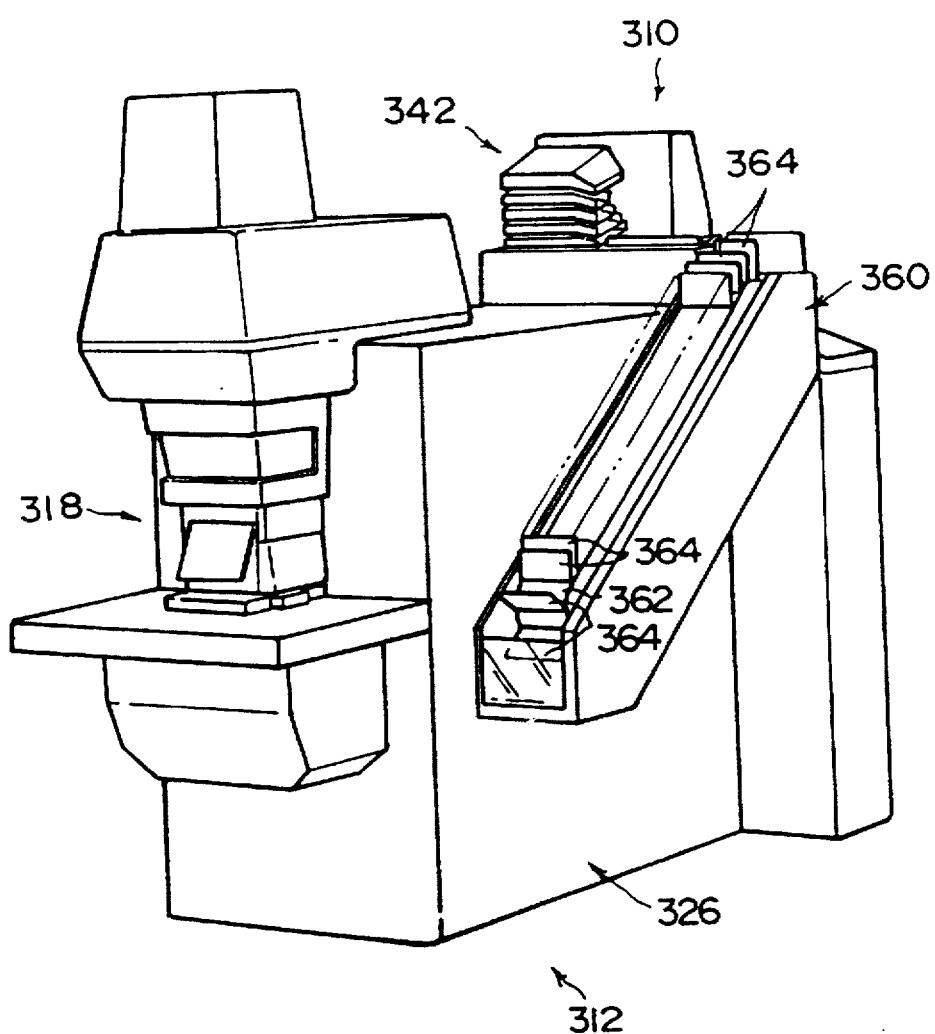
FIG. 8 is a perspective view of a printer processor relating to an embodiment of sixth and seventh aspects of the present invention.

An embodiment of sixth and seventh aspects of the present invention will now be described in detail with reference to the drawings. In FIG. 8, a printer processor 312 equipped with a print stacking device 310 of the present aspects is illustrated.

As shown as an example in FIG. 11, images having various aspect ratios, such as a full size image 314A, a high vision size image 314B, a cinerama size image 314C, a panorama size image 314D and the like, are recorded during photographing by a camera onto a negative film 314. The negative film 314 is set at the printer processor 312 of the present embodiment. Further, a magnetic material is applied to the vicinity of an edge portion of the negative film 314 so as to provide a magnetic track 316. Information which specifies the aspect ratios of the images at the time of photographing is magnetically recorded onto the magnetic track 316 at regions corresponding to the respective images. Information showing photographing conditions and the like may also be magnetically recorded at the same time.

As shown in FIG. 8, a printer portion 318, in which the above-mentioned images recorded on the negative film 314 are printed onto color paper, is provided at the printer processor 312. The printer portion 318 is equipped with a reading head which reads the information magnetically recorded on the magnetic track 316. The printer portion 318 positions the images at the exposure position. After the images have been positioned at the exposure position, the images are photometrically measured. Print magnification, exposure conditions and the like are determined by considering the aspect ratios and the like of the images. An unillustrated negative mask and paper mask are adjusted, and printing processing of the images onto color paper 320 is effected at the above-mentioned exposure conditions. Accordingly, as shown as an example in FIG. 12, the prints, which are printed on the color paper 320 and which correspond to an order for one roll of negative film, include full size prints 320A, high vision size prints 320B, cinerama size prints 320C, and panorama size prints 320D.

An unillustrated marker is provided in the printer portion 318. The marker applies a cut mark 322 between prints of the color paper 320 which passes through the printer portion 318. Further, a sort mark 324 is applied to each print corresponding to one roll of negative film, i.e., each print corresponding to one order.

The color paper 320, on which the images have been printed and to which the cut marks 322 and the sort marks 324 have been applied, is transported to a processor portion 326. Processing tanks for color developing, bleaching/fixing, and washing are provided in the processor portion 326. The color paper 320 is immersed in the processing solutions stored in each of the processing tanks, and is processed. Thereafter, the water content and the like adhering to the surfaces of the color paper 320 is dried in a drying portion. The color paper is then sent to the print stacking device 310.

Figure 9:
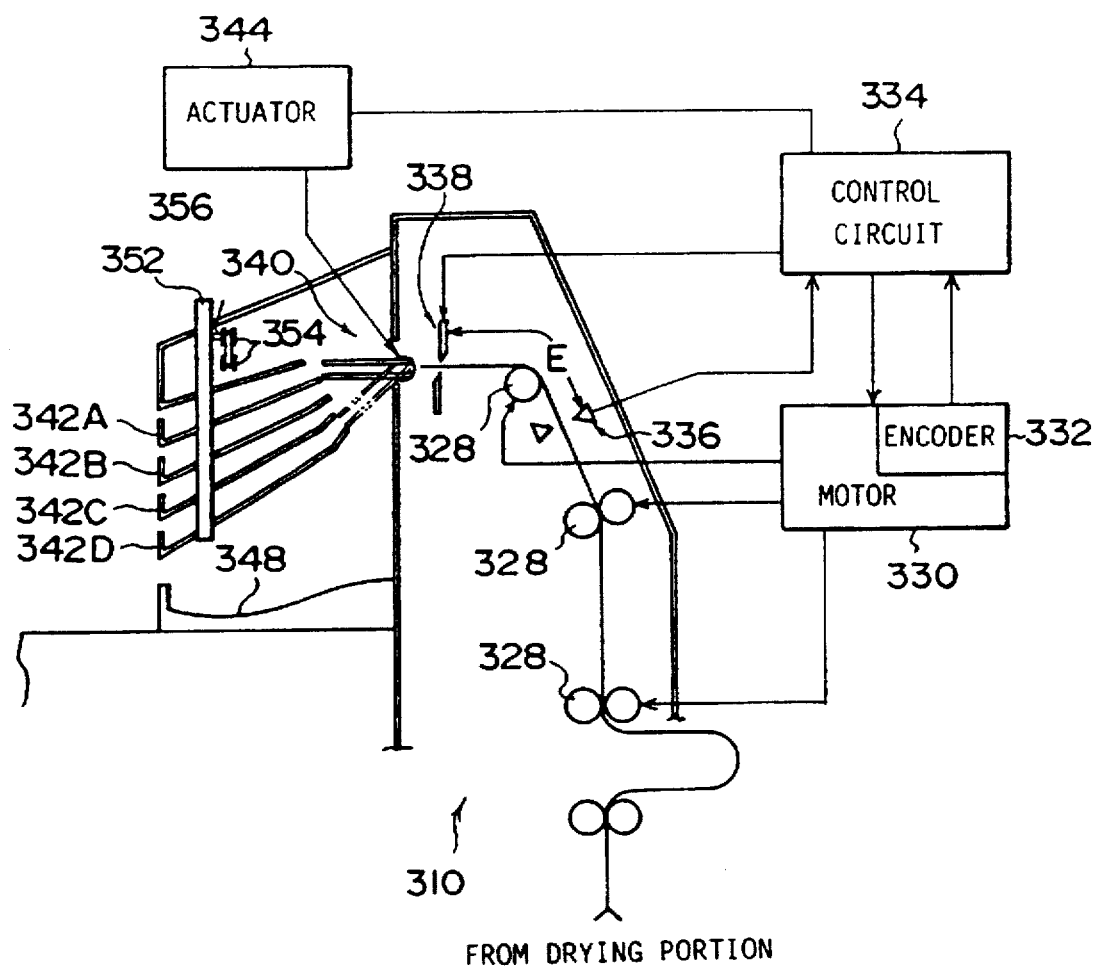
FIG. 9 is a schematic sectional view of a vicinity of a print stacking device.

As illustrated in FIG. 9, a color paper transport path is formed within the print stacking device 310. A plurality of transport rollers 328 is disposed along the color paper transport path. A driving force from a motor 330 is transmitted to the transport rollers 328 so that the transport rollers 328 rotate and the color paper 320 is transported. The color paper 320 is transported into the print stacking device 310 such that the color paper 320 is inserted in the transport path and the image surface is positioned towards the right side in FIG. 9. The rotation of a driving shaft of the motor 330 is converted by an encoder 332 into a pulse signal having a number of pulses which corresponds to the number of revolutions. The pulse signal is input to a control circuit 334.

A sensor 336, which detects the existence of cut marks 322 and sort marks 324 applied to the color paper 320, is disposed in a vicinity of the transport rollers 328. The sensor 336 is connected to the control circuit 334, and outputs a signal, which shows whether or not there is a cut mark 332 and/or a sort mark 324, to the control circuit 334. A cutter 338 is provided on the paper transport path downstream of the area where the sensor 336 is disposed. The cutter 338 is connected to the control circuit 334. Operation of the cutter 338 is controlled by the control circuit 334. After a cut mark 322 has been detected by the sensor 336, the control circuit 334 transports the color paper 320 only a predetermined distance (the distance E shown in FIG. 9) so that the cut mark 322 reaches the area at which the cutter 338 is disposed. The control circuit 334 also operates the cutter 338 so that the color paper 320 is cut into prints.

The prints cut by the cutter 338 are guided downstream of the cutter 338 where a variable guide 340, which can change the direction in which the prints are guided, is provided. The variable guide 340 is pivotable between the position shown by the solid line in FIG. 9 and the position shown by the imaginary line. A plurality of accommodating portions 342A, 342B, 342C, 342D are disposed downstream of the variable guide 340 so as to correspond to the locus of movement of the variable guide 340. The variable guide 340 is pivoted by an actuator 344. The prints cut by the cutter 338 are guided into one of the plurality of the accommodating portions 342A, 342B, 342C, 342D. The prints guided into the accommodating portions 342 are stacked within the accommodating portions 342 such that the image surfaces of the prints face upward. The accommodating portion 342A is used for prints whose aspect ratio is full size. The accommodating portion 342B is used for prints whose aspect ratio is high vision size. The accommodating portion 342C is used for prints whose aspect ratio is cinerama size. The accommodating portion 342D is used for prints whose aspect ratio is panorama size.

Figure 10:
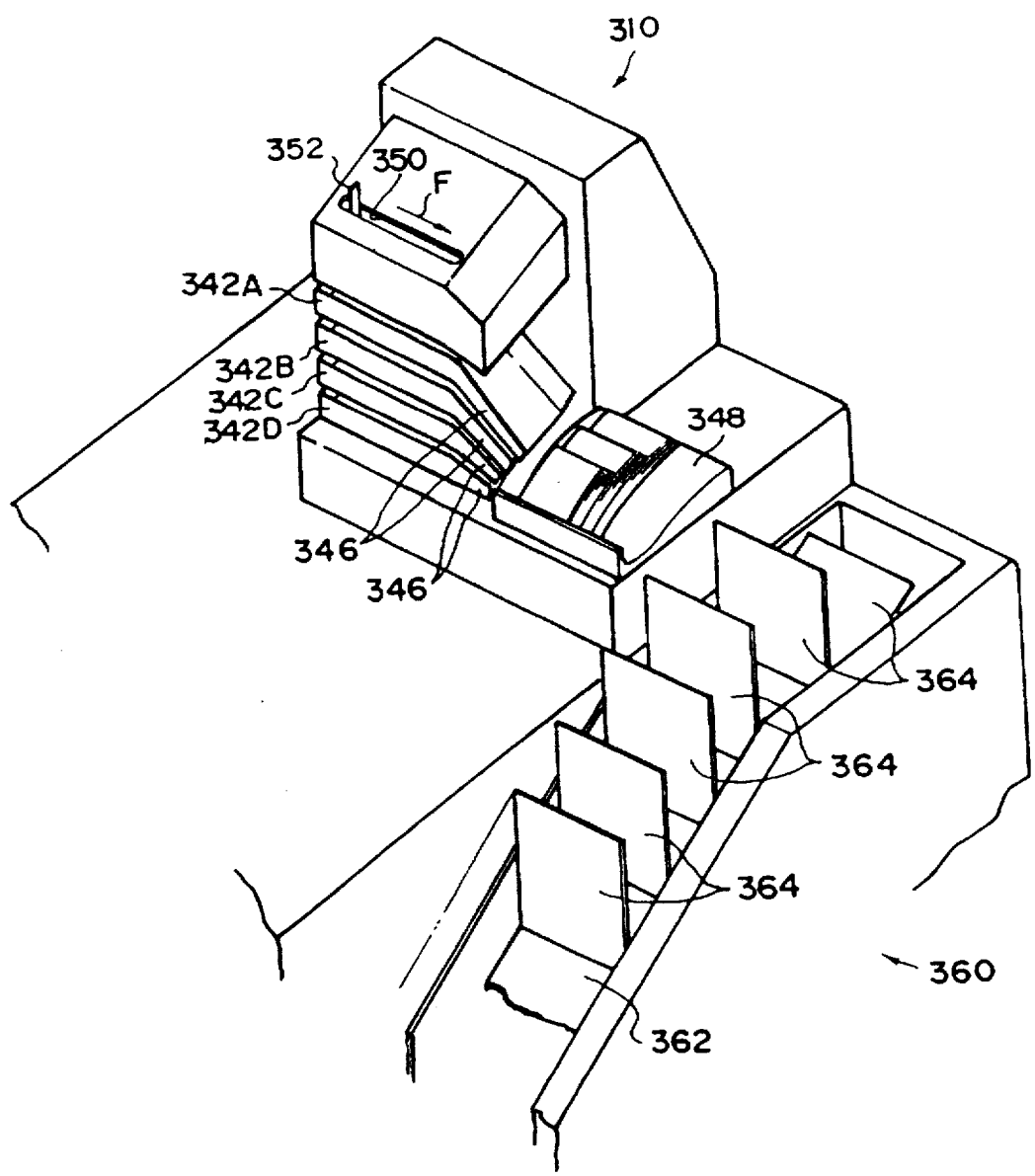
FIG. 10 is a perspective view of a periphery of accommodating portions of the print stacking device.

As shown in FIG. 10, ramps 346 are mounted respectively at side surfaces of the plurality of the accommodating portions 342A, 342B, 342C, 342D. A tray 348 is disposed at the opposite side of the accommodating portions 342 such that the ramps 346 are interposed between the accommodating portions 342 and the tray 348. The ramps 346 are inclined towards the tray 348. Further, as shown in FIG. 10, elongated holes similar to an elongated hole 350 are provided in each of the accommodating portions 342. A rod 352 penetrates through each of the elongated holes. As shown in FIG. 9, a chain 354, which is wound around a pair of unillustrated sprockets, is disposed in a vicinity of an upper end of the rod 352. The rod 352 is mounted to the chain 354 via a bracket 356. A driving force is transmitted from an unillustrated driving means to the chain 354 so that the chain 354 rotates. Accordingly, the rod 352 is moved along the longitudinal direction of the elongated hole 350. When the rod 352 is moved along the elongated hole in the direction of arrow F in FIG. 10, prints which are stacked in the accommodating portions 342 are slid down the ramps 346 and are loaded onto the tray 348.

As shown in FIG. 10, a sorter 360 is provided adjacent to the tray 348. An unillustrated moving mechanism is provided at the tray 348 to move the prints, which are loaded on the tray 348, onto a belt 362, which will be described later, of the sorter 360. The sorter 360 is equipped with the endless belt 362, which is wound around a pair of unillustrated sprockets. A driving force of an unillustrated driving means is transmitted to the sprockets so that the sprockets rotate. Accordingly, the belt 362 is also rotated. A plurality of partition plates 364 are mounted to the endless belt 362 so as to divide the belt 362 into a plurality of accommodating portions. The prints moved to the sorter 360 by the above-mentioned moving mechanism are accommodated in one of the accommodating portions defined by the partition plates 364.

Figure 14:
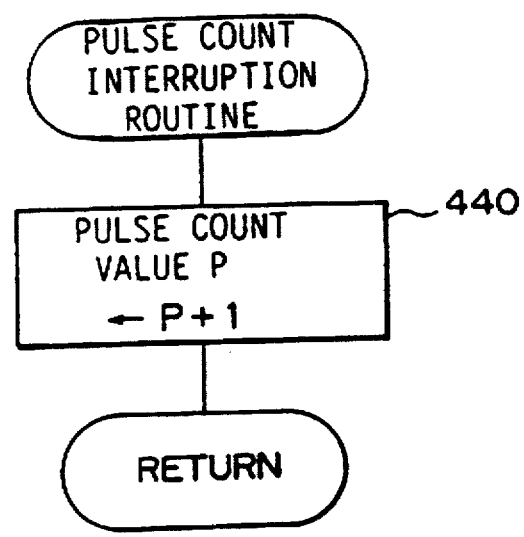
FIG. 14 is a flowchart describing an interruption routine of the second embodiment.

Next, the operation of the present embodiment will be described. First, with reference to the flowchart shown in FIG. 14, an interruption routine of the present embodiment will be described. The interruption routine in FIG. 14 is implemented at the rising of each pulse of the pulse signal inputted from the encoder 332. In step 440, 1 is added to a pulse count value P, and the process is completed. Accordingly, the pulse count value P is increased to a value corresponding to an amount of transport of the color paper 320.

Figure 13A:
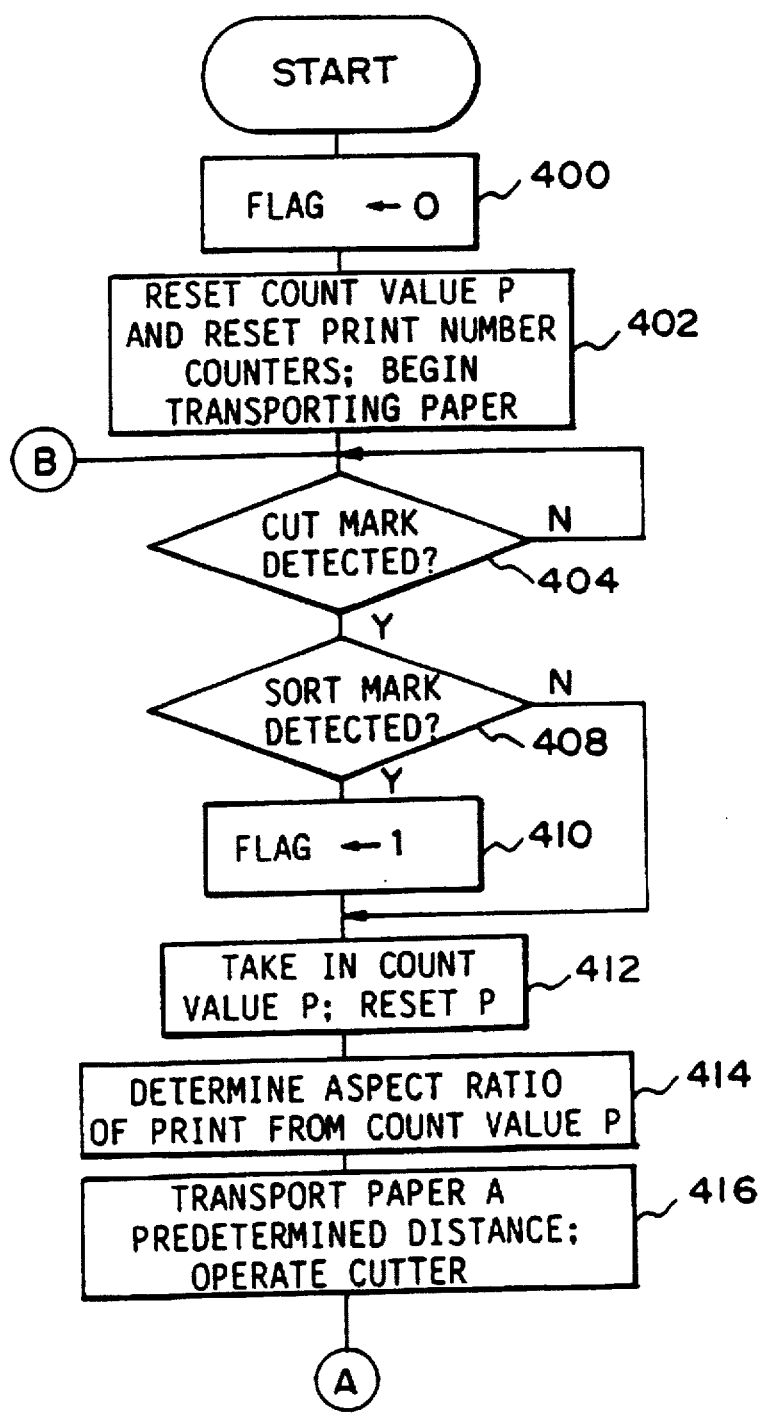
FIGS. 13A and 13B are flowcharts describing operation of the second embodiment.
Figure 13B:
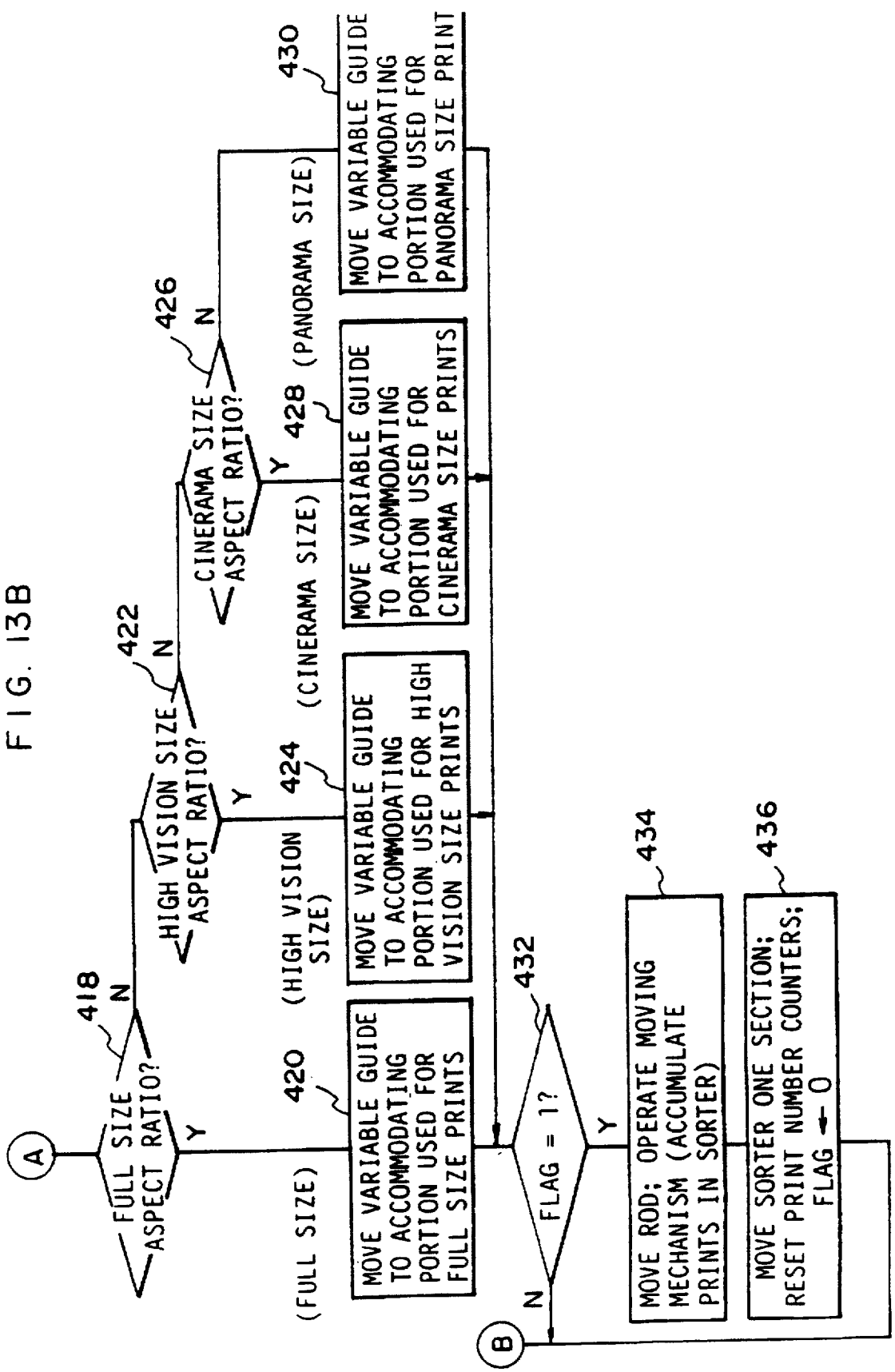

Next, the main routine of the present embodiment will be described with reference to the flowcharts in FIGS. 13A and 13B. The main routine is implemented when the color paper 320, on which the images have been printed and to which the cut marks 322 and the sort marks 324 have been applied, is transported into the print stacking device 310.

In step 400, an area provided in the memory and used as a flag is set to zero. In step 402, the pulse count value P and the values of the print number counters, which are provided for prints of each of the aspect sizes, are reset. Further, the transport rollers 328 are driven so that the transport of the color paper 320 begins.

In step 404, the detection signal of the sensor 336 is monitored, and a determination is made as to whether or not a cut mark 322 has been detected. If the answer to the determination in step 404 is "No", the determination in step 404 is repeated until a cut mark 322 is detected. When a cut mark 322 is detected, the process moves on to step 408 where a determination is made as to whether a sort mark 324 was detected simultaneously with the cut mark 322. If the answer to the determination in step 408 is "No", the process moves to step 412.

In step 412, the pulse count value P is taken in and the count value P is reset. In the subsequent step 414, the aspect ratio of the print is determined based on the taken-in count value P. The count value P corresponds to the distance between adjacent cut marks, i.e., the longitudinal dimension of the print. The transverse dimension of the print is the transverse dimension of the color paper 320 and is constant. Therefore, the aspect ratio of the print can be determined from the count value P.

In step 416, the color paper 320 is transported only the distance between the area at which the sensor 336 is disposed and the area at which the cutter 338 is disposed (the distance E shown in FIG. 9). The cutter 338 is operated, and the color paper 320 is cut. In this way, when the cut marks 322 are positioned at the area at which the cutter 338 is disposed, the cutter 338 is operated, and the color paper 320 is cut into prints.

In step 418, a determination is made as to whether or not the aspect ratio, which was determined in step 414, of the print is an aspect ratio which corresponds to a full size print. If the answer to the determination in step 418 is "Yes", in step 420 the variable guide 340 is moved via the actuator 344 so as to correspond to the accommodating portion 342A used for full size prints. Accordingly, the cut print is guided by the variable guide 340 and is accommodated within the accommodating portion 342A. Simultaneously, the count value of the print number counter for full size prints is increased.

Meanwhile, if the answer to the determination in step 418 is "No", the process moves to step 422 where it is determined whether the aspect ratio of the print is an aspect ratio corresponding to a high vision size print. If the answer to the determination in step 422 is "Yes", in step 424 the variable guide 340 is moved so as to correspond to the accommodating portion 342B used for high vision size prints. Accordingly, the cut print is guided by the variable guide 340 and is accommodated within the accommodating portion 342B. Simultaneously, the count value of the print number counter for high vision size prints is increased.

If the answer to the determination in step 422 is "No", the process moves to step 426 where a determination is made as to whether or not the aspect ratio of the print is an aspect ratio corresponding to a cinerama size print. If the answer to the determination in step 426 is "Yes", in step 428 the variable guide 340 is moved so as to correspond to the accommodating portion 342C used for cinerama size prints. Accordingly, the cut print is guided by the variable guide 340 and is accommodated within the accommodating portion 342C. Simultaneously, the count value of the print number counter for cinerama size prints is increased.

Further, if the answer to the determination in step 426 is "No", it is determined that the aspect ratio of the print is an aspect ratio corresponding to a panorama size print. In step 430, the variable guide 340 is moved so as to correspond to the accommodating portion 342D used for panorama size prints. Accordingly, the cut print is guided by the variable guide 340 and is accommodated within the accommodating portion 342D. Simultaneously, the count value of the print number counter for panorama size prints is increased.

In subsequent step 432, a determination is made as to whether the flag is one. If the answer to the determination in step 432 is "No", the process returns to step 404, and the processes in step 404 through step 432 are repeated. In this way, prints corresponding to one order are classified by aspect ratio. The prints are stacked in the respective accommodating portions 342A, 342B, 342C, 342D which correspond respectively to, in order of ascending aspect ratio, the full size prints, high vision size prints, cinerama size prints, and panorama size prints. Further, the number of prints of each print size is counted for one order.

When the prints corresponding to one order have been completed, the sort mark 324 is detected by the sensor 336. In this case, the answer to the determination in step 408 is "Yes", and the flag is set to one in step 410. The process then moves onto step 412. In this way, the determination in step 432 is "Yes", and the process proceeds to step 434.

In step 434, the rod 352 is moved in the direction of arrow F in FIG. 10. Accordingly, the groups of prints of each aspect ratio stacked within the accommodating portions 342A, 342B, 342C, 342D are slid down the ramps 346 and are loaded on the tray 348. As described above, the images are stacked such that the prints in each accommodating portion correspond to the respective aspect ratio and the image surfaces of the prints face upward. Therefore, the groups of prints are stacked on the tray 348 in the order of full size, high vision size, cinerama size, and panorama size, as seen from the image surface side. Further, in step 434, the moving mechanism is operated so that the prints loaded on the tray 348 are moved onto the belt 362 of the sorter 360.

In step 436, the driving means is driven, and the belt 362 of the sorter 360 is moved by an amount of one section partitioned by the partition plates 364. Moreover, the count values of the counters for each size are stored, and the count values are reset. The flag is set to zero, and the process returns to step 404. By the above-described processes, prints for one order are accommodated in a space defined by the partition plates 364.

In this way, in the present embodiment, prints are gathered and stacked in the spaces of the sorter 360 such that the prints having the same aspect ratio are grouped together. Therefore, the management of the prints at after-processes such as inspection, verification, and the like improves. Inspection work, verification work and the like can be carried out easily. The appearance also improves. Moreover, after-processes such as inspection, verification and the like are usually effected with the prints corresponding to one order disposed such that the image surfaces thereof are facing forward. However, in the present embodiment, the groups of prints are arranged in order of the-aspect ratios, and the group of prints with the low aspect ratio is stacked at the image surface side. Therefore, when the images of the prints having the low aspect ratio are verified during inspection, verification, or the like, the high aspect ratio prints do not get in the way. Inspection work, verification work, and the like can thereby be carried out efficiently.

Further, in the present embodiment, the numbers of prints of each aspect ratio, which correspond to one order, are counted and stored. Therefore, the calculation of the cost of one order and the like can be easily carried out in the after-processes.

The cut marks 322 and the sort marks 324 applied to the color paper 320 are not limited to the marks shown in FIG. 12. For example, cut marks and sort marks may be indicated by punch holes provided in the color paper 320.

Moreover, in the present embodiment, the aspect ratio of a print is determined by using the encoder to measure the distance between adjacent cut marks 322. However, the aspect ratio may also be determined by using a pulse motor to measure the distance from the number of pulses of a pulse current provided by a pulse motor. Further, the present invention is not limited to a method of determining the aspect ratio by measuring the distances between the cut marks 322. For example, code information showing the aspect ratio Of each print may be printed at the printer portion 318 onto the rear surface of each print. This code information may be, for example, read optically so that the aspect ratio may be determined. Moreover, at the printer portion 318, punch holes showing the aspect ratio of each print may be formed, and the aspect ratio can be determined by detecting these punch holes. Further, the aspect ratios for each print of one roll of the negative film 314 corresponding to one order may be made to correspond to ID, which expresses the order of the negative film 314, and stored by a storing means of a memory or the like. In this case, information distinguishing the ID is applied to the first print of the order. This information is read so as to determine the ID. The stored information is read, and processing is effected.

In the present embodiment, the aspect ratios of each of the images recorded on the negative film 314 are magnetically stored on the magnetic track 316. This information is read at the printer portion 318 of the printer processor 312, and print processing of the images is effected. However, the aspect ratio of each image may be expressed as, for example, a bar code, and recorded on the negative film 314. Further, the information may be recorded on a memory card or the like provided separately from the negative film 314.

In the present embodiment, there are four types of aspect ratios of the images recorded on the negative film 314: full size, high vision size, cinerama size, and panorama size. The four accommodating portions 342A, 342B, 342C, 342D are provided so as to correspond to the sizes. However, the present invention is not limited to the above aspect ratios and the above number of varieties of aspect ratios.

Figure 15:
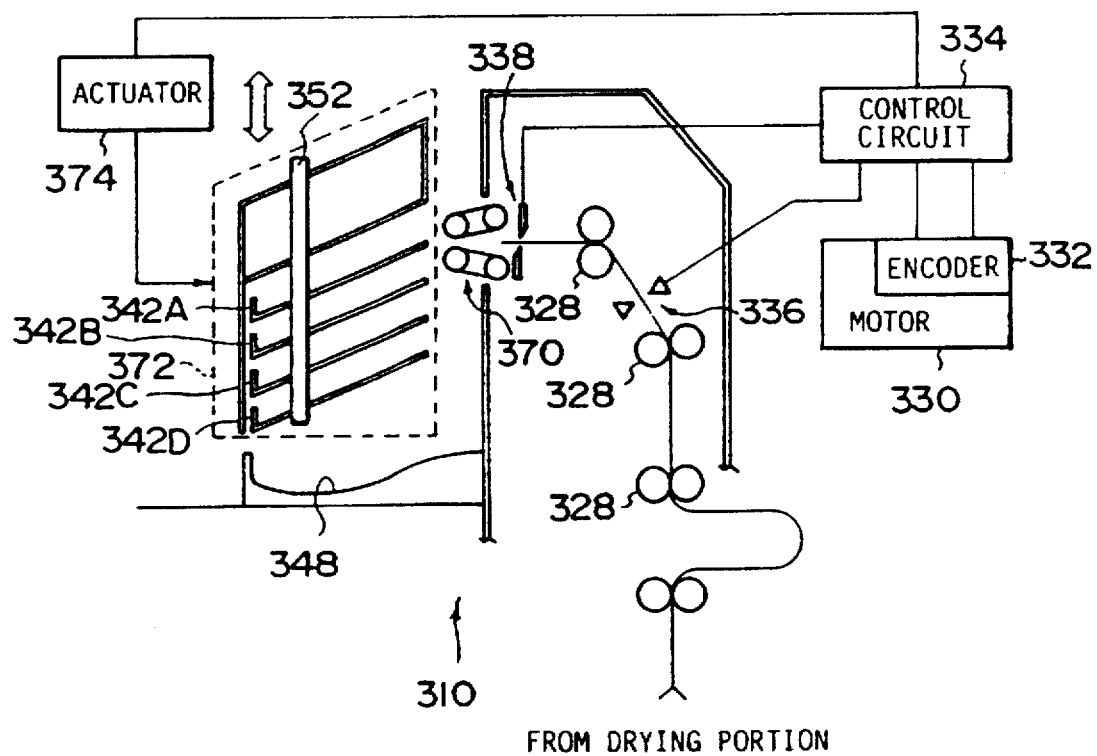
FIG. 15 is a schematic sectional view illustrating another example of the print stacking device.

Moreover, in the present embodiment, the variable guide 340 is pivoted and guides each print such that prints of different aspect ratios are stacked in different accommodating portions. However, as shown in FIG. 15, a structure may be provided in which a fixed guide 370, which does not pivot, is provided instead of the variable guide, and a accommodating portion 372, which is equipped with the plurality of accommodating portions 342A, 342B, 342C, 342D, is movable in directions of rising and falling (directions shown by the arrow in FIG. 15). The accommodating portion 372 is moved upward and downward via an actuator 374 in accordance with the aspect ratio of each print. One of the plurality of the accommodating portions 342 is made to correspond to a guide 370 such that prints of different aspect ratios are stacked in different accommodating portions 342.

Further, in the present embodiment, an example is shown in which the print stacking device 310 is mounted to the printer processor 312. However, for example, the print stacking device of the present aspect may be disposed at a print discharge side of paper cutter used in a lab or the like.

What is claimed is:

1. A print processing method for printing a plurality of images having different aspect ratios recorded on a negative film, comprising the steps of:

(a) automatically detecting a width of an image plane which is perpendicular to a longitudinal direction of the negative film and judging the aspect ratio of an image,
   (b) applying projection magnification, corresponding to the judged aspect ratio, to said image,
   (c) performing masking, corresponding to the judged aspect ratio, of a photographic paper,
   (d) transporting the photographic paper for a distance which corresponds to the judged aspect ratio, and positioning the photographic paper,
   (e) printing said image recorded on the negative film onto the photographic paper and cutting the photographic paper to the size corresponding to the judged aspect ratio.

2. A print processing method according to claim 1, wherein said step of automatically detecting the width is carried out by irradiating light to a transported negative film and detecting an intensity of light transmitted through the negative film.

3. A print processing method according to claim 2, wherein said step of automatically detecting the width is carried out by detecting an edge of each image frame by detecting the intensity of light transmitted through the negative film.

4. A print processing method according to claim 2, wherein said step of automatically detecting the width is carried out by detecting the intensity of light at a plurality of detection points.

5. A print processing method according to claim 1, further comprising the following step before said step (a): transporting the negative film and setting the negative film at a printing position.

* * * * *